July 23, 1929.　　　　L. BERGE　　　　1,721,765

COLLAR SECURING MEANS

Filed May 4, 1925

Inventor
Louis Berge
By Blackmore, Spencer & Hall
Attorney

Patented July 23, 1929.

1,721,765

UNITED STATES PATENT OFFICE.

LOUIS BERGE, OF FLINT, MICHIGAN, ASSIGNOR TO A C SPARK PLUG COMPANY, OF FLINT, MICHIGAN, A COMPANY OF MICHIGAN.

COLLAR-SECURING MEANS.

Application filed May 4, 1925. Serial No. 27,954.

The object of this invention is to provide a simple means for securing a collar or similar part to a shaft so as to prevent its separation therefrom. The drawings show one form my invention may assume and as shown therein I have provided the shaft with an indentation or groove and have forced a part of the material of the collar into the groove thus fixing it securely in place.

In the drawings:

Figure 2 is a longitudinal section showing one form of construction; while

Figure 1:
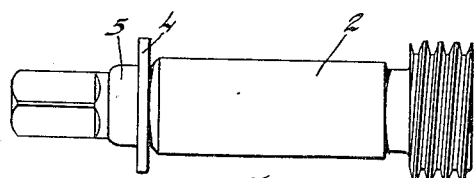
Figure 1 is a side elevation of a worm shaft for a speedometer showing my invention applied thereto.
Figure 2:
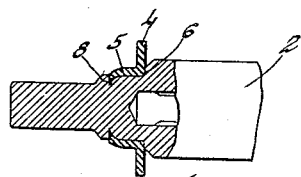

I have shown my invention applied to the specific purpose of securing a collar to a shaft, in this case the worm shaft which forms part of the operating connections of the speedometer. This, of course, merely illustrates one application of my invention and it is obvious that it may be employed in connecting many other similar parts used in varied relations.

On the drawing the reference character 2 indicates a shaft and 4 the collar. This collar is formed as a radial flange extending from a cylindrical flange 5 snugly embracing the shaft, and preferably abuts against the shoulder 6 formed upon the shaft while the free end of the cylindrical flange 5 extends in proximity to a groove 8 cut into the reduced end of the shaft. In the assembly of the parts the collar is slipped over the shaft until it abuts against the shoulder 6 whereupon it is subjected to a rolling operation which forces the material of the cylindrical flange into the groove thereby locking the parts against separation.

Figure 3:
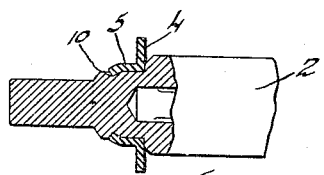
Figures 3 and 4 show slightly different forms.

If desired the groove may be shaped as shown at 10 in Figure 3 in order to more closely conform to the contour of the rolled down portion of the cylindrical flange.

Figure 4:
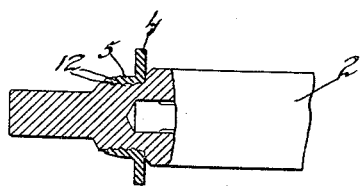
Figure 5:
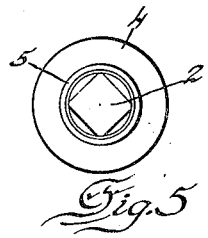
Figure 5 is an end elevation of the assembled parts.

Another alternative construction is shown in Figure 4 where a plurality of grooves 12 are substituted for the single groove of the previous constructions and wherein intermediate portions of the material of the cylindrical flange are forced into the grooves instead of the free end portion.

I claim:

A shaft having between its ends a shoulder and a groove, a collar on the shaft engaging the shoulder and having a cylindrical flange shrunk into the groove, whereby the collar is permanently secured on the shaft.

In testimony whereof I affix my signature.

LOUIS BERGE.